Nov. 17, 1964   L. DUNTLEY   3,157,155
POULTRY LOADER AND TRANSPORT ENCLOSURE
Filed March 14, 1962
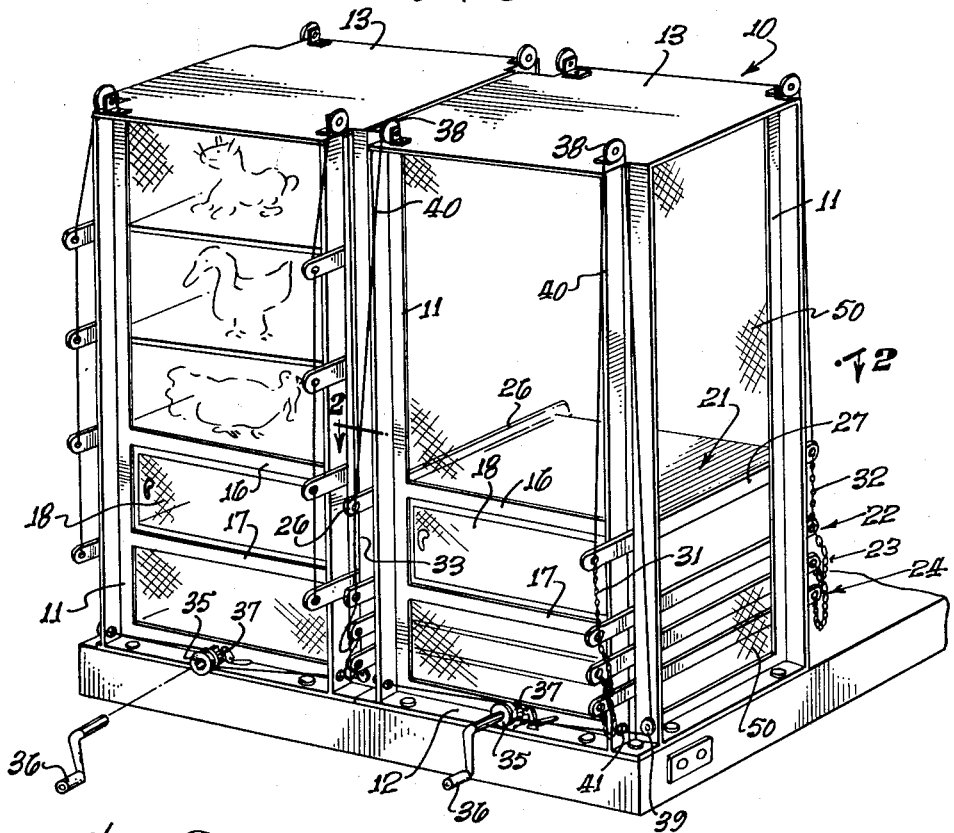
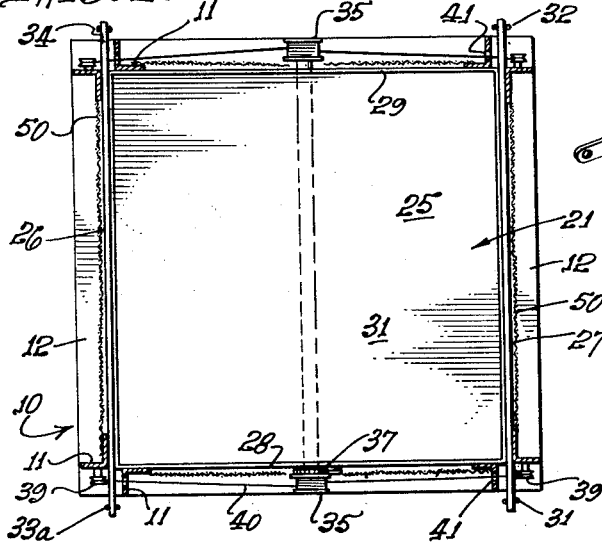
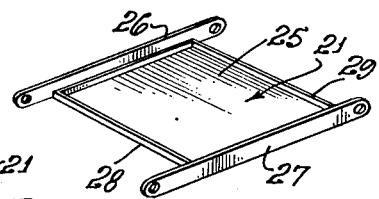
LEO DUNTLEY,
INVENTOR.
BY HIS ATTORNEYS
Spensley & Horn

United States Patent Office 3,157,155
Patented Nov. 17, 1964

3,157,155
POULTRY LOADER AND TRANSPORT
ENCLOSURE
Leo Duntley, 11031 Aqua Vista, North Hollywood, Calif.
Filed Mar. 14, 1962, Ser. No. 179,544
3 Claims. (Cl. 119—19)

This invention relates to enclosures and more particularly to enclosures for the transportation of poultry and small animals.

At the present state of the art, mass transportation of poultry is usually accomplished by disposing a number of screen enclosures upon the flat bed of an open truck, each of the enclosures having a series of shelves to define a tier of four or five individual cages. Each of the cages within the enclosure is provided with its own access door. To load the poultry into the enclosures, each door is opened and the bird inserted into its cage. To reach the uppermost cages of the enclosures, as they are mounted on the truck, it is frequently necessary to utilize a stepladder if a loading ramp or shelf is unavailable. Under such conditions, it is extremely difficult to load a live turkey, weighing on the order of 30 pounds or more, into the uppermost cages of the enclosures.

Accordingly, it is an object of the present invention to provide easily loadable enclosures.

It is also an object of the present invention to provide bottom loading enclosures containing tiers of individual compartments.

It is another object of the present invention to provide improved poultry transporting enclosures.

It is a further object of the present invention to provide improved poultry transporting enclosures wherein the poultry is loaded into individual compartments through a single access door.

The objects of the present invention are generally accomplished by a vertically extending enclosure having an access door in a lower side portion, the enclosure containing tiers of shelves which are flexibly interconnected, and adjustable support means for selectively positioning the upper shelf in a plurality of predetermined positions between an uppermost position near the top of the enclosure and a lowermost position near the bottom of the enclosure. When the upper shelf is in the lowermost position, it is approximately at the level of the lower edge of the access door, and the other underlying shelves are beneath it resting one upon the other in a closed accordion fashion. The access door is opened and the first bird is inserted into the enclosure on the upper surface of the upper shelf. The upper shelf is then raised until the next underlying shelf reaches the lower edge of the access door and another bird is inserted, and so on until the uppermost shelf containing the first bird is at the uppermost position. With the enclosure fully loaded, each of the underlying shelves is suspended from the shelf above it a predetermined distance sufficient to accommodate a bird. The procedure for unloading the birds from the enclosure is the converse of the loading procedure. After removal of each bird through the access door, the shelf assembly is lowered until the next higher shelf is at the lower edge of the loading door. Through the use of the present invention apparatus, the loading and unloading of the poultry transporting enclosure is relatively simple and very convenient since all loading is done near the bottom of the enclosure.

The novel features which are believed to be characteristic of the invention, both as to its organization and method of operation, together with further objects and advantages thereof, will be better understood from the following description considered in connection with the accompanying drawings in which a presently preferred embodimet of the invention is illustrated by way of example. It is to be expressly understood, however, that the drawing is for the purpose of illustration and description only, and is not intended as a definition of the limits of the invention.

In the drawing:

FIGURE 1 is a perspective view showing two poultry transporting enclosures mounted on a truck bed;

FIGURE 2 is a view taken along the line 2—2 of FIGURE 1; and

FIGURE 3 is a perspective view of one of the shelves in the enclosures.

Turning now to the drawing, in FIGURES 1 and 2 thereof, the general construction of a presently preferred embodiment is illustrated. A rectangular skeleton framework, indicated generally by the reference numeral 10, is covered with suitable screen material 50. In the illustrated embodiment, eight angle iron vertical supports 11 are mounted upon a rectangular base plate 12. There are two angle iron supports 11 at each corner of the base plate 12, the supports 11 being oriented and spaced as shown in FIGURE 2. A top plate 13 is secured to the upper ends of the supports 11. The screen material 50 is in the form of panels with each panel extending along a side surface of the enclosure between the supports 11. Due to the spacing and orientation of the supports 11, together with the method of securing the screen material as side panels, a small space in the form of a vertically extending slot 15 is defined at each corner of the enclosure between the adjacent angle supports 11. Horizontally extending between the supports 11 at the front of the enclosure are two spaced apart crossbars 16 and 17. In the rectangular space between the crossbars and the supports 11, there is provided an access door 18.

Within the enclosure 11 are positioned four identical movable shelves, respectively designated as an upper shelf 21, and underlying shelves 22, 23 and 24. A perspective view of the upper shelf 21 is shown in FIGURE 3. The shelf 21 consists of a rectangular metallic sheet 25 mounted to a framework consisting of side bars 26 and 27 and interconnecting bars 28 and 29. The interconnecting bars 28 and 29 are spaced slightly inwardly from the ends of the side bars 26 and 27 so that the ends of the side bars 26 and 27 project outwardly from the sheet 25 as shown. The length of the side bars 26 and 27 is sufficiently great so that the projecting end portions of these side bars extend from the enclosures through the slots 15 between the supports 11. Thus, each of the shelves 21-24 is constrained within the enclosure 10 by the angle supports 11 for vertical movement therein with the side bars of the shelves moving in the slots 15.

Each of the projecting ends of the side bars of each shelf is connected by a cable to the similar sidebar end of the shelf directly beneath it. For example, the projecting ends of the side bar 27 of the shelf 21 are connected to the similar side bar of the shelf 22 by interconnecting cables 31 and 32. The projecting ends of the side bar 26 of the shelf 21 are connected to the similar side bar of the shelf 22 by interconnecting cables 33 and 34. All of the interconnecting cables are of an identical length, substantially equal to the vertical spacing between the crossbars 16 and 17, to maintain the shelves in a generally horizontal position.

Rotatably mounted in the bottom of the enclosure 10, beneath the tray 24 is a cable drum 35, with one end of the drum protruding from the rear of the enclosure and the other end of the drum protruding from the front of the enclosure. A crank arm 36 is detachably engageable with the front end of the cable drum 35 for rotation of the drum. Also mounted on the front end of the drum 35 is a ratchet wheel 37. A spring loaded pawl 38 is mounted to the base plate 12 adjacent the ratchet wheel 37 to permit free rotation of the cable drum 35 in one direction while normally preventing it from rotating in the other direction. The cable drum 35 can be rotated in the other direction by applying a force to the pawl 38 to overcome the spring loading force which holds the end of the pawl in engagement with the ratchet wheel 37.

Rotatably mounted to the enclosure 10, at an upper front corner thereof, is a pulley 38, the pulley 38 being oriented for rotation in a vertical plane parallel with a side wall of the enclosure. Rotatably mounted at the lower front corner of the enclosure 10 is another pulley 39, the pulley 39 being oriented for rotation in a vertical plane parallel with the front wall of the enclosure. A coupling cable 40 passes over the pulleys 38 and 39, one end of the coupling cable 40 being secured to the projecting end of the side bar 27 of the upper shelf 21 at the front of the enclosure and the other end of the cable 40 passing through an aperture 41 in the bottom of the front support 11 and is wound in a clockwise direction about the cable drum 35 and secured thereto. Each of the other projecting ends of the side bars of the upper shelf 21 is provided with similar pulleys and coupling cables so that each corner of the upper shelf 21 is effectively coupled to the cable drum 35 whereupon clockwise rotation of the cable drum 35 will raise the upper shelf 21 within the enclosure 10, the ratchet and pawl arrangement normally maintaining the upper shelf 21 at any height to which it is raised.

To load an empty enclosure 10, the pawl 38 is disengaged from the ratchet wheel 37 and the cable drum 35 rotated in a counterclockwise direction to lower the upper shelf 21 to a lowermost position even with the crossbar 17. At this point, the pawl 38 is engaged with the ratchet wheel 37 and the access door 18 opened and a bird inserted therein on top of the upper shelf 21. The cable drum 35 is rotated in a clockwise direction by means of the crank 36 until the upper shelf 21 is raised to a position in alignment with the crossbar 16 at the upper edge of the access door 18. (The upper shelf 21 of the right-hand enclosure 10 of FIGURE 1 of the drawing is shown in this intermediate position.) In this intermediate position, another bird is inserted through the access door 18 and placed upon the shelf 22. In this intermediate position, the interconnecting cables 31, 32, etc. connecting the upper shelf 21 with the shelf 22 have just become taut so that further raising of the upper shelf 21 will cause raising of the shelf 22 with the shelf 22 being maintained a fixed distance below the shelf 21 in accordance with the length of the interconnecting cables. The upper shelf 21 is then raised until the interconnecting cables coupling the shelf 22 to the underlying shelf 23 become taut and raise the shelf 23 to a position in alignment with the crossbar 17, in which position another bird may be loaded by placing it upon the shelf 23. Further raising of the upper shelf 21 will eventually cause the lowermost shelf 24 to be raised to a position in alignment with the crossbar 17 for loading of the last bird. (The left-hand enclosure 10 of FIGURE 1 is shown in the fully loaded position.) Thus, it is seen that the entire loading operation is completed through the access door 18 positioned near the bottom of the enclosure, thereby eliminating the necessity of reaching the top of the enclosure.

The enclosure 10 is conveniently constructed of angle iron, as shown in the illustrated embodiment, although wood and other forms of suitable structural material will become apparent to those skilled in the art. The spacing of the crossbars 16 and 17 are determined by the size of the bird or animal which the access door must accommodate, and the spacing of the crossbar 17 from the bottom of the enclosure is determined by the position of the upper shelf 21 when the interconnecting cables are completely slack and each shelf rests upon the shelf immediately below it.

Although the invention has been described with a certain degree of particularity, it is understood that the present disclosure has been made only by way of example and that numerous changes in the details of construction and the combination and arrangement of parts may be restored to without departing from the spirit and the scope of the invention as hereinafter claimed. For example, although a rudimentary cable and drum arrangement has been illustrated as the adjustable support means for selectively positioning the upper shelf, other suitable adjustable means, such as gear means or screw driven means, for example, may be utilized.

What is claimed is:

1. A poultry transporting device comprising, in combination: a vertically extending enclosure consisting of a rectangular skeleton framework covered by a screen material, said screen material having an access door in a lower side portion of said enclosure; an upper shelf and one or more underlying shelves disposed within said enclosure; adjustable support means for selectively positioning said upper shelf in a plurality of predetermined positions between an uppermost position a predetermined distance from the top of said enclosure and a lowermost position in which said upper shelf is proximate the lower edge of said access door; and, flexible means suspending each of said underlying shelves from the shelf above it when said upper shelf is in said uppermost position with the lowermost of said shelves being proximate the lower edge of said access door.

2. A poultry transporting device comprising, in combination: a vertically extending enclosure consisting of a rectangular skeleton framework covered by a screen material, said screen material having an access door in a lower side portion of said enclosure; a plurality of substantially identical shelves consisting of an upper shelf and one or more underlying shelves disposed within said enclosure; adjustable means suspending said upper shelf from the top of said enclosure selectively at a plurality of predetermined positions between an uppermost position a predetermined distance from the top of said enclosure and a lowermost position in which said upper shelf is proximate the lower edge of said access door, said adjustable means including a manually operable crank assembly and cable means interconnecting said crank assembly with said upper shelf; and, flexible means suspending each of said underlying shelves from the shelf above it when said upper shelf is in said uppermost position with the lowermost of said shelves being proximate the lower edge of said access door.

3. A poultry transporting device comprising, in combination: a vertically extending enclosure consisting of a rectangular skeleton framework covered by a screen material, said screen material having an access door in a lower side portion of said enclosure; a plurality of substantially identical shelves consisting of an upper shelf and one or more underlying shelves disposed within said enclosure, said shelves being interconnected by flexible means; adjustable support means for selectively positioning said upper shelf in a plurality of predetermined positions between an uppermost position and a lowermost position, said adjustable support means consisting of a crank arm and a cable and a guide means and a ratchet mechanism, said guide means being mounted near the top of said enclosure, said crank arm and said ratchet mechanism being mounted near the bottom of said enclosure, said cable passing over said guide means and having one end thereof secured to said upper shelf and the lower end thereof secured to said crank arm, said ratchet mechanism being normally engaged with said crank arm to permit free rotation of said crank arm only in the direction which causes said upper shelf to be raised, said ratchet mechanism being selectively disengageable from said crank arm to permit lowering of said shelves.

References Cited by the Examiner

UNITED STATES PATENTS 1,165,308  12/15  Barnes _____ 211—176
2,718,872  9/55  Essary et al. _____ 119—18

SAMUEL KOREN, *Primary Examiner.*

ALDRICH F. MEDBERY, *Examiner.*